3,657,378
PREPARING POLYACRYLATES
Henry Volk, Bay City, and Percy Jay Hamlin, Midland, Mich., assignors to The Dow Chemical Company, Midland, Mich.
Filed Jan. 14, 1969, Ser. No. 790,988
Int. Cl. C08f 3/44, 15/00, 15/36
U.S. Cl. 260—80 L          12 Claims

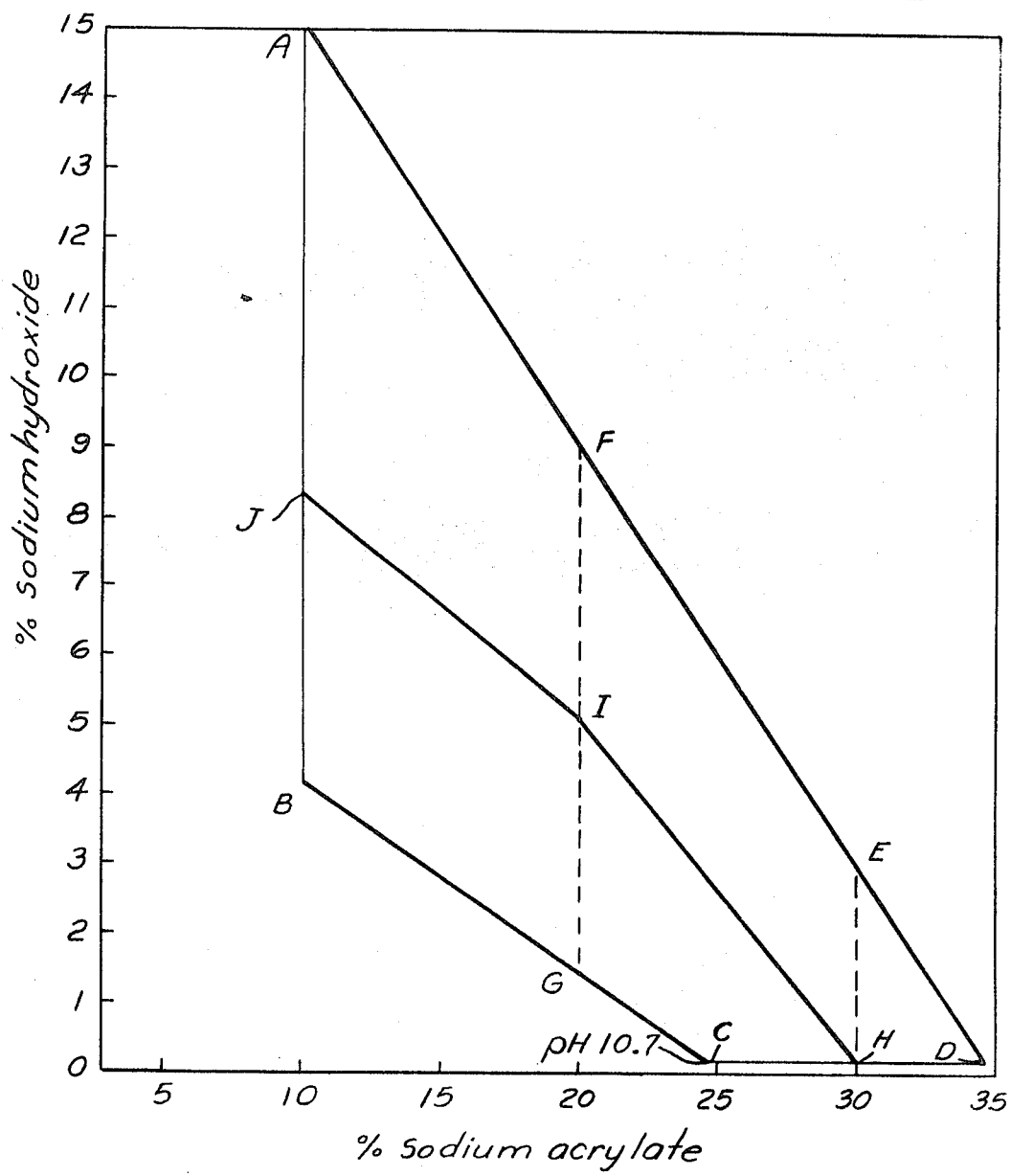

ABSTRACT OF THE DISCLOSURE

Polyacrylates are prepared in aqueous solution under specially controlled reaction conditions to produce efficient flocculants. Alkali metal acrylate is polymerized at a monomer concentration within the range from about 10 weight percent of the polymerization system up to the monomer saturation level. The monomer solution is adjusted to a pH of at least about 10.7 by the addition of an alkali metal hydroxide. The upper limit on the amount of hydroxide that can be employed will range downwardly from about 15 weight percent of the polymerization system to less than 1 percent for monomer concentrations from 10 weight percent up to the monomer saturation level. Further improvement in polymer properties is achieved by the incorporation of at least about 1 weight percent, based on the weight of polymerization system, of an alkali metal salt.

---

Because it is readily polymerized and used extensively in polymerization reactions, acrylic acid has been the subject of numerous polymerization studies. Usually this monomer is polymerized as an acid. Previous studies have shown that increasing the pH of the acrylic acid polymerization system decreases both the degree and rate of polymerization. See for example, Kogyo Kagaku Zasshi, Journal Chemical Society, Japan, Industrial Chemical Section, volume 58, pages 194–196 (1955).

Although acrylic acid can be polymerized to high molecular weight, flocculant grade polymers in the acid form, it is necessary in the processing of the polymerizate to mix a neutralizing reagent with the polymer gel. This is a difficult physical operation inasmuch as the aqueous polymerizates are very viscous and not readily mixed with other reagents, such as sodium and potassium hydroxides.

It would be particularly desirable to provide an improved process for the preparation of alkali metal polyacrylates. Especially desirable are polymers of this nature characterized by high molecular weights and flocculation utilities. A further object is to provide a polymerization process which produces such polymers directly.

The instant invention is directed to the above ends and involves polymerizing an alkali metal acrylate, e.g., sodium or potassium acrylates and sodium or potassium methacrylates, in water solution under specially controlled reaction conditions.

The accompanying drawing depicts the general range of preferred operating conditions in regard to the two major parameters of the instant invention, i.e., alkali metal hydroxide and monomer concentrations.

In the practice of the polymerization process of the invention, monomer concentration is maintained within the range from about 10 weight percent of the polymerization system up to about the monomer saturation level and preferably from about 20 to about 35 weight percent of the aqueous polymerization charge. This solution is adjusted to at least about pH 10.7 by the addition of an alkali metal hydroxide. Depending upon the monomer concentration, the upper limit on the amount of hydroxide added will range from about 15 to less than 1 weight percent, based on the total weight of the system, as the monomer concentration increases from about 10 to about 35 weight percent. Polymerization is conducted at a temperature within the range from about 0° up to about 100° C., preferably from about 25° C. to about 60° C.

Although the process of the invention is essentially directed to the preparation of homopolymers of the alkali metal acrylates, e.g., sodium acrylate and methacrylate, amounts of other monomers compatible with the polymerization charge can be included in the polymerization system. Normally such comonomers will comprise a minor proportion, e.g., less than about 25 weight percent, of the monomer charge. Examples of suitable comonomers include sodium styrene sulfonate, sodium ethylene sulfonate, 2-sulfoethylacrylate and maleate and vinyl acetate. In general any anionic or nonionic monomer which is soluble in the polymerization system and is not adversely affected by the high pH can be copolymerized with the acrylates in accordance with the invention.

Further improvement in the above described polymerization process is achieved by introducing into the polymerization ssytem at least about 1 percent by weight of an alkali metal salt such as sodium or potassium chloride or sulfate. Such salts yield polymers of even higher molecular weight and greater flocculation efficiencies. These salts are useful at concentrations up to and exceeding the saturation level for the given system.

The above described recipes are polymerized by known techniques. Most conveniently the reaction is carried out as a solution polymerization reaction in water. Alternate modes include suspension and emulsion polymerization techniques whereby the monomer solution is first prepared and then either suspended or emulsified in a water immiscible liquid such as an aromatic or aliphatic liquid hydrocarbon.

Initiation of polymerization is accomplished by purging the monomer system of inhibitory oxygen and applying suitable catalytic means, such as chemical free radical catalysts or high energy irradiation, including X-rays, gamma rays and high energy electrons. Suitable chemical catalysts include sodium persulfate, potassium persulfate, ammonium persulfate, azobisbutyronitrile, tertiary butylhydroperoxide and in general any of the peroxidic acid polymerization initiators not adversely affected by the high pH. Also operable are the redox initiator systems which involve the use of a reducing agent conjunctively with the oxidizing reagent.

Following completion of the polymerization reaction, the polymer is recovered by any convenient technique. When the polymerization is conducted in aqueous solution, the polymer may be recovered as by drum drying the polymerizate. Emulsion and suspension polymerization systems are well adapted for removing water by azeotropic distillation followed by a liquid-solids separation, as by filtering.

Polymers prepared in accordance with the invention are characterized by high molecular weights and good flocculation utilities. Since molecular weight determinations are time consuming, a first approximation thereof is made by measuring the viscosity of a standard polymer solution. For the purposes hereof, this determination is obtained on a 0.4 percent by volume solution of the polymer in 0.5 N NaCl at pH 8. The viscosity measurement is made with an Ostwald viscometer at 30° C. Polymers prepared in accordance with the invention are characterized by such a viscosity of at least 10 centipoises.

The instant invention will be further illustrated by reference to the following specific embodiments.

EXAMPLES 1–10

Freshly distilled acrylic acid, in an amount of 600 grams, was mixed with 1000 milliliters of water. The mixture was adjusted to pH 10.7 by the addition of 646 grams of about 50 percent aqueous caustic. A large portion of this was used in the neutralization of the acid. The resulting solution, which analyzed 34.33 percent by weight sodium acrylate was used for a series of polymer preparations at a constant monomer concentration of 30 percent but with varying amounts of additional caustic.

The polymerization recipes were charged to a one liter resin flask equipped with a stirrer, nitrogen sparger, gas outlet and thermometer. Air was removed from the monomer system by sparging with nitrogen. Sodium meta bisulfite was then added in an amount of 0.003 percent followed by potassium persulfate in an amount of 0.006 percent, said percentages being based on the weight of monomer. Each polymerization recipe was maintained throughout the polymerization within the range of 25° to 35° C. After 19 hours the polymerizations were terminated and the polymerizate analyzed for residual monomer. From this data, the conversions of monomer to polymer were calculated for each recipe.

The polymers were isolated from the polymerizates by precipitation with methanol. Volatiles were removed by drying at about 40°–50° C. in a vacuum oven. The viscosity of the dried product was determined using an Ostwald viscometer to measure 0.4 percent by volume polymer solutions in 0.5 normal sodium chloride.

The activity of the polymers as flocculants was determined by flocculation tests on a 10 percent by volume slurry of montmorillonite clay in 0.6 normal sodium hydroxide. The clay suspension was contained within a stoppered 100 milliliter graduate. The suspension was treated with an applicating solution containing 0.025 weight percent of dissolved polymer at doses of 1, 2 and 3 milliliters. After mixing the polymer with the clay suspension according to a standard procedure, which involved rotating the graduate three times after introduction of the polymer, the lapsed time for the interface between the clarifying supernatant liquid and settling solids to descend from the 90 milliliter to the 60 milliliter mark was measured. These times are reported as the "flocculation times."

The recipes to prepare several polymers and the measurements of physical characteristics and flocculation times are reported as Examples 1–5 in Table I. Examples 6–10 in Table I were similar in every respect to the procedure described above except that the polymerizate was heated during the polymerization reaction over a temperature range from 23° to 40° C. and the reaction time was extended to 112 hours to obtain more complete conversions.

mer levels, the minimum pH is also critical. This was illustrated by the comparative polymerization of sodium acrylate at the monomer saturation level (approximately 38.2 weight percent at 30° C.) at pH 10.25 and in the presence of 0.1 weight percent caustic (pH>10.7). At the lower caustic concentration, the polymer was essentially insoluble while at the higher level, a water-soluble, flocculant grade polymer was obtained. Preferably the amount of additional alkali is within the range from about 0.01 up to about 1.0 percent by weight, based on the polymerization system, i.e., the alkali acrylate monomer solution.

Data for Drawing

In a manner similar to the procedure employed above in Examples 1–10, polymerizations were conducted at 5, 10 and 20 weight percent monomer concentrations. A redox catalyst system comprising potassium persulfate and sodium bisulfite in a 2/1 weight ratio was employed at levels of from about 0.009 to about 0.0375 weight percent based on monomer. As monomer increased in concentration, the amount of catalyst was reduced. The temperature during polymerization ranged from room temperature to 35° C. Polymers were prepared in the above manner with varying amounts of caustic ranging from an amount just sufficient to produce a pH of 10.7 up to an amount at which levels the polymerization characteristics began to deteriorate.

The results of these polymerizations in terms of high viscosity polymer products are represented graphically, along with the results of Examples 1–10, in the accompanying drawing wherein the ordinate represents the percent by weight caustic and the abscissa the percent by weight sodium acrylate employed in the polymerization recipes. The zone of polymerization conditions necessary for the preparation of high viscosity flocculant grade polymers is represented by the polygon A, B, C, D. Accordingly the relative proportions of these two ingredients should be maintained within proportions defined by said polygon. Line IJ represents a near optimum for relative proportions of the specified reagents over the monomer range from 10 to 30 weight percent. The polygon EFGCH defines monomer and hydroxide proportions for a preferred subembodiment of the invention.

EXAMPLES 11–16

In a manner similar to the polymerization mode employed above, sodium acrylate was polymerized at 20

TABLE I

| Example number | Polymerization recipe | | | Reaction time | Temp., °C. | Monomer conversion, percent | Viscosity, cps. | Flocculation times (sec.) | | |
|---|---|---|---|---|---|---|---|---|---|---|
| | Acrylate, wt. percent | Additional NaOH, wt. percent | Monomer solution, pH | | | | | | | |
| 1 | 30 | | 10.6 | 19 | (¹) | 83.6 | 13.5 | 65 | 22 | 14.5 |
| 2 | 30 | 0.1 | 12.6 | 19 | (¹) | 89.2 | 27.0 | 23 | 9 | 4.4 |
| 3 | 30 | 0.5 | 13.3 | 19 | (¹) | 27.8 | 31.2 | 15 | 6.8 | 3.2 |
| 4 | 30 | 1.0 | 13.6 | 19 | (¹) | 18.3 | 25.6 | 18.5 | 6.9 | 3.1 |
| 5 | 30 | 5.0 | | 19 | (¹) | 5.4 | | | | |
| 6² | 30 | | 10.4 | 112 | 23–40 | 4.7 | | | | |
| 7 | 30 | 0.1 | 12.6 | 112 | 23–40 | 99.3 | 29.0 | 26 | 11 | 6.5 |
| 8 | 30 | 0.5 | 13.3 | 112 | 23–40 | 99.4 | 22.9 | 38 | 14 | 6.9 |
| 9 | 30 | 1.0 | 13.6 | 112 | 23–40 | 98.6 | 21.5 | 35 | 16 | 7.8 |
| 10 | 30 | 5.0 | | 112 | 23–40 | 95.6 | 14.5 | 52 | 20 | 9.0 |

¹ Room temperature.
² On occasion, there is failure to obtain effective initiation of the polymerization, when the pH of the monomer system is too low.

It will be observed from the above data that a small amount of caustic in excess of that necessary to neutralize the acrylic acid monomer is necessary for successful results at high monomer concentrations. Compare Examples 1 and 6 with those following. At such high monoweight percent in water, with and without the addition of additional caustic. Polymerization times, temperatures and the amount of catalyst were controlled to provide a comparative showing of the effect of the additional caustic on conversions. The results as well as the particular polymerization conditions employed are set forth in the following Table II.

TABLE II

| Example number | Sodium acrylate, wt. percent | Percent NaOH | Percent NaCl | pH | Percent catalyst | Polymerization time (hours) | Polymerization temp. (° C.) | Monomer conversion (percent) |
| --- | --- | --- | --- | --- | --- | --- | --- | --- |
| 11 | 20 | | | 9.0 | 0.018 | 72 | 35 | 40.1 |
| 12 | 20 | 5 | | 13.9 | 0.018 | 72 | 35 | 95 |
| 13 | 20 | | | 9.2 | 0.018 | 50 | 35 | 0 |
| 14 | 20 | 5 | | 13.9 | 0.018 | 50 | 35 | 98.5 |
| 15 | 20 | | 5 | 9.4 | 0.018 | 20 | 35 | 36 |
| 16 | 20 | 1 | 5 | ~13 | 0.018 | 20 | 35 | 93 |

From the above data it will be apparent that the addition of sodium hydroxide gives a substantial improvement in conversion of monomer to polymer. Example 12 which contained 5 percent sodium hydroxide based on charge weight (pH 13.9) had a conversion of 95 percent while Example 11 which was polymerized at the same conditions but at pH 9.0 was converted only to the extent of 40.1 percent. Similar comparisons are shown by Examples 13 and 14 and also 15 and 16.

EXAMPLES 17-21

In this example series, polymerizations were conducted in accordance with the preferred, subembodiment of the invention which utilizes an inorganic salt and a base, conjunctively. A monomer charge contained 10 percent by weight monomer, 1 percent by weight sodium hydroxide and 0.036 percent by weight based on monomer, of the redox catalyst system employed in the Example 11. The polymerization was conducted at 35° C. until conversions from 95-97 percent were achieved. This required approximately 63 hours. The polymerization gel was diluted with sufficient water to prepare a polymer applicating solution and employed in the flocculating tests as utilized for evaluation of polymer in Examples 1-10. The results are set forth in the following Table III.

TABLE III

| Example number | NaCl, wt. percent | Conversion, percent | Viscosity (cps.) | Flocculation time, sec. |
| --- | --- | --- | --- | --- |
| 17 | 0 | 96.2 | 1.9 | 290 |
| 18 | 1 | 94.7 | 2.1 | 250 |
| 19 | 5 | 97.3 | 2.8 | 160 |
| 20 | 10 | 96.6 | 4.8 | 82 |
| 21[1] | 20 | 95.0 | 6.8 | 28 |

[1] Small amount of NaCl not completely dissolved.

From the above data it will be apparent that the inclusion of sodium chloride substantially improved the viscosity and correspondingly the flocculation times achieved with the described polymerizates. It will be noted that the amount of caustic relative to monomeric concentration is outside the preferred ranges and this accounts for the relatively poor results. Even poorer results would have been achieved had the caustic been omitted.

Although the invention has been illustrated by solution polymerization techniques, it should be understood that other modes of polymerization may incorporate the improvements and advantages of the instant invention. For instance, inverse emulsion and bead suspension polymerization techniques may be carried out utilizing monomer solutions in which the monomer concentration and solution pH are adjusted in accordance with the parameters of the instant invention. Basically, in these polymerization techniques the monomer solution is suspended in a heat transfer medium with either an emulsifying or polymeric suspending agent. Details as to such suspension techniques are set forth in U.S. Pats. 3,211,708, 3,278,506 and 3,284,393.

Depending upon the particular polymerization technique utilized, the polymer may be simply recovered from the polymerizate as by drying the polymerizate to recover the polymer solids. More conveniently, precipitation and, in the instance of the emulsion and suspension polymerization techniques, precipitation with a non-solvent or azeotropic drying followed by filtration of the polymer solids from the polymerization medium may be employed to recover polymer solids. It should be understood, however, that separation of the polymer solids is not necessary to their useful application. For instance, the polymer gels and suspensions thereof can be directly employed to prepare polymer applicating solutions and, in some instances, the emulsion polymer systems can be applied as flocculants without prior dilution.

What is claimed is:

1. A method for preparing alkali metal polyacrylates which comprises:
   (1) forming an aqueous solution containing from about 10 percent by weight up to about the monomer saturation level of dissolved alkali metal acrylate or methacrylate and sufficient alkali metal hydroxide to impart to the solution a pH of at least about 10.7, with an overall upper limit on the amount of hydroxide present of about 15 percent by weight based on the weight of the monomer solution, and
   (2) purging the monomer system of inhibitory oxygen and polymerizing the resulting monomer system at a temperature within the range from about 0° up to 100° C. in the presence of a polymerization catalyst therefor whereby a high molecular weight, water-soluble polyelectrolyte is produced.

2. A method as in claim 1 and including the additional step of separating the alkali metal polyelectrolyte from the polymerizate.

3. A method as in claim 1 wherein the alkali metal hydroxide is sodium hydroxide.

4. A method as in claim 1 wherein the proportions of hydroxide and acrylate monomer fall within the ranges defined by the polygon ABCD in the accompanying drawing.

5. A method as in claim 1 wherein the proportions of hydroxide and acrylate monomer fall within the ranges defined by the polygon EFGCH in the accompanying drawing.

6. A method as in claim 1 wherein the acrylate concentration is within the range from about 20 to 35 percent by weight of the total polymerization system.

7. A method as in claim 1 wherein the acrylate is an alkali metal salt of acrylic acid.

8. A method as in claim 1 wherein the acrylate is an alkali metal salt of methacrylic acid.

9. A method as in claim 1 and including the additional step of introducing from about 1 percent by weight up to its saturation level of an alkali metal inorganic salt to the polymerization charge.

10. A method as in claim 9 wherein the salt is sodium chloride.

11. A method as in claim 9 wherein the salt is sodium sulfate.

12. A method for preparing alkali metal polyacrylates which comprises:
   (1) forming an aqueous solution containing from about 30 percent by weight up to the monomer saturation level of dissolved alkali metal acrylate and from about 0.01 to 1 percent by weight of alkali metal hydroxide, purging the system of inhibitory oxygen, and
   (2) polymerizing the resulting monomer system at a temperature within the range from about 0° up to 100° C. in the presence of a polymerization catalyst therefor whereby a high molecular weight, water-soluble polyelectrolyte is produced.

References Cited

UNITED STATES PATENTS

| | | | |
|---|---|---|---|
| 3,405,106 | 10/1968 | Scanley | 260—80 |
| 3,472,243 | 10/1969 | Wall | 132—7 |
| 3,493,500 | 2/1970 | Volk | 210—54 |

FOREIGN PATENTS

| | | | |
|---|---|---|---|
| 500,475 | 2/1939 | Great Britain | 260—80 |
| 642,423 | 6/1962 | Canada | 260—80 |
| 777,306 | 6/1957 | Great Britain | 260—80.3 |

JOSEPH L. SCHOFER, Primary Examiner

C. A. HENDERSON, JR., Assistant Examiner

U.S. Cl. X.R.

209—5; 210—54; 260—79.3 MU, 80 M, 85.7